(No Model.)
2 Sheets—Sheet 1.
S. SELDEN & M. GRISWOLD, Jr.
Waffle Iron.
No. 229,280.
Patented June 29, 1880.
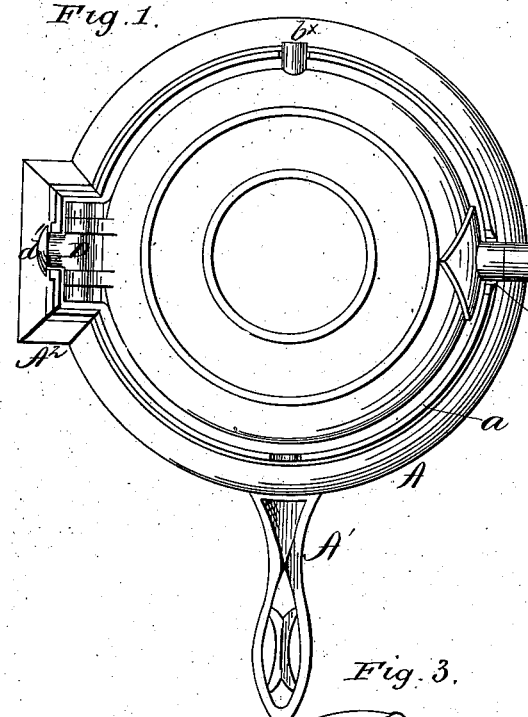
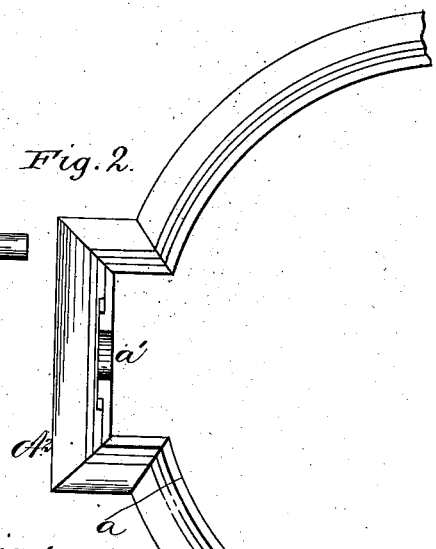
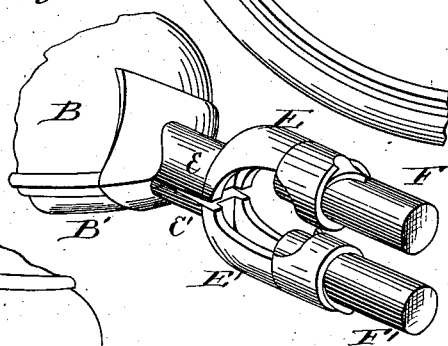
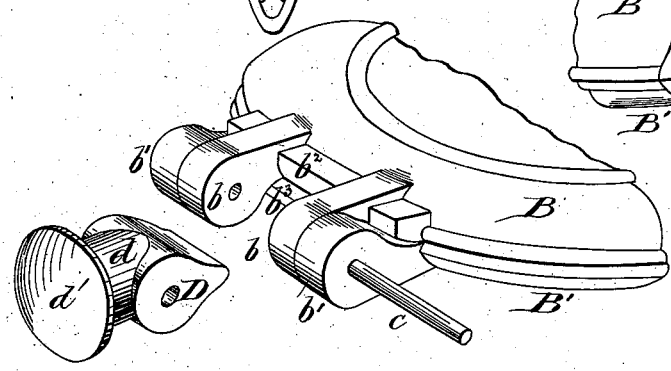
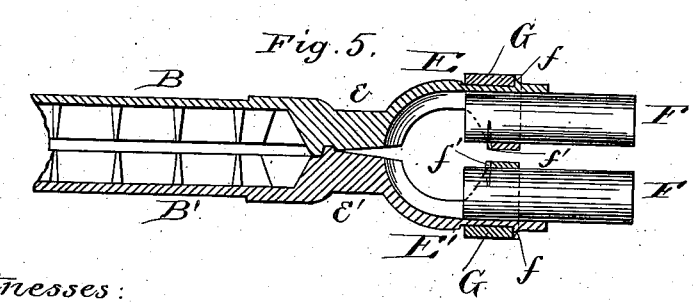
Witnesses:
W. B. Masson
Alex Mohn
Inventor
Saml. Selden
Matthew Griswold Jr.
by Sell Smith atty (No Model.)
2 Sheets—Sheet 2.
S. SELDEN & M. GRISWOLD, Jr.
Waffle Iron.
No. 229,280. Patented June 29, 1880.
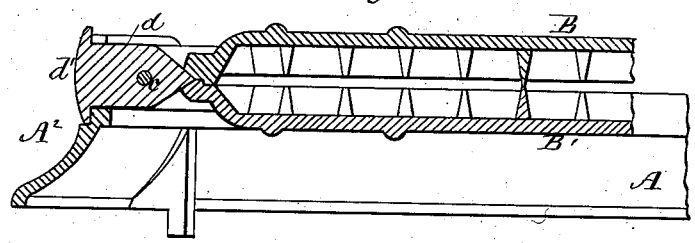
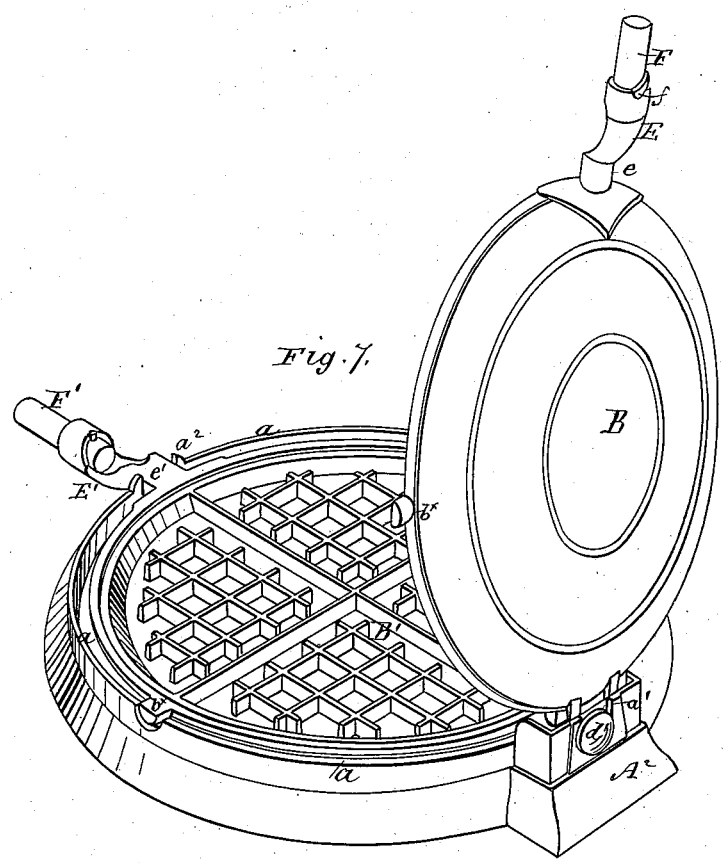

UNITED STATES PATENT OFFICE.

SAMUEL SELDEN AND MATTHEW GRISWOLD, JR., OF ERIE, PENNSYLVANIA.

WAFFLE-IRON.

SPECIFICATION forming part of Letters Patent No. 229,280, dated June 29, 1880.

Application filed March 31, 1880. (No model.)

*To all whom it may concern:*

Be it known that we, SAMUEL SELDEN and MATTHEW GRISWOLD, Jr., of Erie, county of Erie, State of Pennsylvania, have invented certain new and useful Improvements in Waffle-Irons, of which the following is a full, clear, and exact description, reference being had to the accompanying drawings, making part of this specification, in which—

Figure 1 is a plan view of our improved waffle-iron complete. Fig. 2 is a similar view of a portion of the supporting ring or frame enlarged. Fig. 3 is a perspective view of the hinge and pivot-block connecting the two parts of the pan and upon which the pan is rotated. Fig. 4 is a perspective view of the pan handle or handles, and Fig. 5 represents a longitudinal section through the same. Fig. 6 is a transverse section through the hinge and pivot, and also through a portion of the pan; and Fig. 7 is a perspective view of the pan with the lid opened.

Similar letters of reference denote corresponding parts wherever used.

In waffle-irons as ordinarily constructed the hinge connecting the two parts of the pan has been made separate from the pivot on which the pan rotates, and located at one side of the pan relatively to said pivot.

Our improvement consists in a novel construction of the hinge connecting the two parts of the divided pan, whereby one of the pivots or journals on which the pan rotates is made to form a part of said hinge, the hinge and pivot being thus brought together, while the opposite pivot or journal on which the pan rotates is formed on the divided handle, by means of which the pan is rotated, and by means of which, also, either portion of the pan which for the time being is uppermost is lifted for opening the pan.

It further consists in a novel construction and arrangement of the socket in the rim or supporting-ring for the reception of the hinge and pivot, whereby the tilting or dumping of the pan is prevented when the cover is raised, and in a novel manner of attaching the wooden handles, as hereinafter described.

In the accompanying drawings, A represents the supporting ring or frame, made, except in particulars hereinafter noted, in the usual form and provided with the usual handle A' and vertical rib or flange $a$, in which the bearings for the pivot of the pan are formed. This ring, instead of being made in the form of a complete circle, as is usual, has an angular projection, $A^2$, at one side, forming a socket in the inner wall of the ring for the reception of the hinge connecting the two parts B B' of the pan, which is made in the usual form, each part being provided with lugs or ears $b$ $b'$, through which a pin, $c$, passes for hinging said parts to each other. A space is left between the inner adjacent ears, $b$ $b$, for the introduction of a perforated block, D, through which also the pin $c$ passes, uniting said block to the divided pan and making it form a part of the hinge, conforming in shape to the shape of the lugs $b$ $b'$, except that inside the pin $c$ it tapers inward in a wedge form, terminating between two lips, $b^2$ $b^3$, formed on the parts B B', one on each, between the lugs $b$ $b'$, and provided with flaring inner faces, conforming to the wedge shape of block D, said faces resting in contact with the wedge on opposite sides. By this construction any movement of the block D relatively to the pan B B' as a whole, and the consequent sagging or depression of the side of the pan connected therewith below the plane of the frame A, is prevented.

The block D, outside of its point of attachment to lugs $b$ $b'$, is made in the form of a headed pivot or journal, $d$, which rests in a semi-cylindrical bearing-socket, $a'$, in the flange $a$ on the end wall of the socket $A^2$, with the head $d'$ outside of said flange, as shown in Fig. 1. By this arrangement end movement of the pivot and of the pan connected therewith is prevented, and as the hinge of the pan rests in a socket projected outside of the circle of ring A, when the side of the pan which is uppermost is raised it passes beyond a vertical plane until the lugs $b$ or $b'$ rest against the rib or flange $a$, thus supporting the raised lid or pan, and the edge of the pan thus raised overhangs and rests upon the ribs or portion of flange $a$ at the sides of the socket and prevents the accidental rotation of the pan when open. The portion of flange $a$ at the back and sides of the socket are raised a little higher than the other part of said flange, for the purpose of supporting the raised lid, as described.

The pan on the side opposite the pivot-block D is provided with a double or divided handle, E E', attached one-half to each half of the divided pan by a semi-cylindrical portion, $e$ $e'$, which, when brought together, as shown in Fig. 4, forms one of the journals upon which the pan is rotated, said journal resting in a semi-cylindrical bearing-socket, $a^2$, in flange $a$, opposite socket $a'$.

Outside the journal $e$ $e'$ the handles E E' diverge or curve outward away from each other for a short distance, when they are again brought into planes parallel with each other, sufficiently separated to permit the attachment thereto of separate wooden rods or handles F F', as shown.

The receptacles E E' for the handles are made in the form of semi-cylindrical sockets, tapering slightly toward their ends and grooved on their outer faces, or provided near said ends with a lug or shoulder, $f$, for the retention of rings or ferrules G, placed over the ends, as shown.

The wooden handles F F' are driven or fitted tightly in between the semi-cylindrical socket in the handle and the surrounding ring G, drawing the latter down snugly into its groove or behind the lug $f$, and a pin, $f''$, is then driven into the handle inside of or behind the ferrule, as shown, thus preventing its withdrawal. The ferrule is notched to receive the pin, and also where it rests against the lug or spur, thus preventing rotation of both the ferrule and of the wooden pin or handle secured therein. The wood being a non-conductor of heat, its employment facilitates the manipulation of the pan.

A divided pin, $b^\times$, on one side of the pan limits the throw or revolving movement of the pan to a half-revolution, resting upon one side or the other in a notch or recess in the flange $a$.

Having now described our invention, we claim—

1. In a waffle-iron, the hinge upon which the pan opens, provided with one of the journals or pivots on which the pan is rotated.

2. The journals or pivots on which the pan rotates, formed upon or connected one with the hinge upon which the pan opens and the other on the handle for rotating and opening said pan.

3. The waffle-iron frame or ring provided with the enlargement or projection on one side, as described, forming the socket for the hinge of the pan and a support for the lid when raised, substantially as described.

4. The pivot-block D, connected with the hinge of the pan B B', and provided with the headed journal $d$, on which the pan rotates, arranged and operating substantially as described.

5. The pivot-block D, provided with the wedge-shaped projection on its inner end, in combination with the lips on the pan for preventing the pan from sagging or dropping below the plane of its supporting-frame, substantially as described.

6. The wooden handles secured in place in the semi-cylindrical sockets E by means of a separate ferrule clamping said sockets and the wooden handle and held in place by the stops and retaining-pins, substantially as described.

SAMUEL SELDEN.
MATTHEW GRISWOLD, JR.

Witnesses:
S. S. SPENCER,
T. A. LAMB.